United States Patent
Tang et al.

(10) Patent No.: US 11,041,971 B2
(45) Date of Patent: Jun. 22, 2021

(54) FULL WAVEFIELD INVERSION WITH AN IMAGE-GATHER-FLATNESS CONSTRAINT

(71) Applicants: Yaxun Tang, Spring, TX (US); Rongrong Lu, The Woodlands, TX (US); Yaofeng He, Spring, TX (US)

(72) Inventors: Yaxun Tang, Spring, TX (US); Rongrong Lu, The Woodlands, TX (US); Yaofeng He, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 165 days.

(21) Appl. No.: 16/420,774

(22) Filed: May 23, 2019

(65) Prior Publication Data

US 2020/0003920 A1    Jan. 2, 2020

Related U.S. Application Data

(60) Provisional application No. 62/693,073, filed on Jul. 2, 2018.

(51) Int. Cl.
G01V 1/30        (2006.01)
G01V 1/28        (2006.01)

(52) U.S. Cl.
CPC .............. *G01V 1/303* (2013.01); *G01V 1/282* (2013.01)

(58) Field of Classification Search
CPC .... G01V 1/303; G01V 1/282; G01V 2210/51; G01V 2210/67; G01V 1/30
See application file for complete search history.

(56) References Cited

U.S. PATENT DOCUMENTS

2011/0255371 A1*  10/2011  Jing .................. G01V 1/28
                                           367/73
2013/0311149 A1   11/2013  Tang et al.
(Continued)

FOREIGN PATENT DOCUMENTS

WO   WO 2013/093467 A1   6/2013
WO   WO 2018/031113 A1   2/2018

OTHER PUBLICATIONS

Wei Zhang et al., Adjoint-Driven Deep-Learning Seismic Full-Waveform Inversion, IEEE Transactions on Geoscience and Remote Sensing, p. 1-20 (Year: 2020).*

(Continued)

*Primary Examiner* — Mischita L Henson
(74) *Attorney, Agent, or Firm* — ExxonMobil Upstream Research Company, Law Department

(57) ABSTRACT

Methods for updating a physical properties model of a subsurface region that combine advantages of FWI and tomography into a joint inversion scheme are provided. One method comprises obtaining measured seismic data; generating simulated seismic data using an initial model; computing at least one of an FWI gradient and a tomography gradient; minimizing a joint objective function E, wherein the objective function E is based on a combination of the FWI gradient and the tomography gradient or preconditioning of the FWI gradient or the tomography gradient; generating a final model based on the minimized joint objective function E; and using the final model to generate a subsurface image. The joint objective function E may be a function of one or both a FWI objective function $C_{FWI}$ and a tomography objective function $C_{Tomo}$. The joint objective function E may be defined as a weighted sum of $C_{FWI}$ and $C_{Tomo}$.

9 Claims, 4 Drawing Sheets

(56) References Cited

U.S. PATENT DOCUMENTS

| | | | | |
|---|---|---|---|---|
| 2013/0311151 | A1* | 11/2013 | Plessix | G06F 30/20 |
| | | | | 703/2 |
| 2013/0343672 | A1* | 12/2013 | Yu | G06T 11/003 |
| | | | | 382/276 |
| 2014/0119628 | A1* | 5/2014 | Elad | G06T 11/006 |
| | | | | 382/131 |
| 2016/0238729 | A1* | 8/2016 | Warner | G01V 1/282 |
| 2017/0168177 | A1* | 6/2017 | Wang | G01V 1/36 |
| 2018/0045839 | A1* | 2/2018 | Tang | G01V 1/303 |
| 2018/0275300 | A1* | 9/2018 | Akcelik | G01V 1/282 |
| 2020/0124752 | A1* | 4/2020 | Baumstein | G01V 1/282 |

OTHER PUBLICATIONS

Treister et al., Full Waveform Inversion Guided By Travel Time Tomography, SIAM Journal on Scientific Computing, vol. 39, No. 5, pp. S587-S609 (Year: 2017).*

Tang, Y., et al., (2010) "Preconditioning full waveform inversion with phase-encoded Hessian" *Society of Exploration Geophysicists*, 2010 SEG Annual Meeting, Oct. 17-22, Denver, Colorado; pp. 1034-1038.

Tang, Y., et. al., (2013). "Tomographically enhanced full wavefield inversion", *Society of Exploration Geophysicists*, 2013 SEG Annual Meeting, Sep. 22-27, Houston, Texas; pp. 1037-1041.

Allemand T, et al. (2014) "Full Waveform Inversion Guided Migration Velocity Analysis." *SEG Technical Program Expanded Abstracts*, vol. 33, pp. 4712-4717.

Biondi, B., et al. (2013) "Tomographic Full-Waveform Inversion (TFWI) by Combining FWI and Wave-Equation Migration Velocity Analysis", *The Leading Edge*, vol. 32, No. 9, pp. 1074-1080.

Fleury, C, et al. (2013) "Bi-Objective Optimization for the Inversion of Seismic Reflection Data: Combined FWI and MVA." *Society of Exploration Geophysicists*, NY; Curran Associates, Inc.; pp. 2908-2913.

Guitton, A. (2004) "Amplitude and Kinematic Corrections of Migrated Images for Nonunitary Imaging Operators." *Geophysics*, vol. 69, No. 4, pp. 1017-1024.

Tang Y, et al. (2015) "Multi-Parameter Full Wavefield Inversion Using Non-Stationary Point-Spread Functions." *SEG Technical Program Expanded Abstracts*, vol. 34, pp. 1111-1115.

Tarantola A. (1984) "Inversion of Seismic Reflection Data in the Acoustic Approximation" *Geophysics*, vol. 49, No. 8, 1984, pp. 1259-1266.

Treister, E, et al. (2016) "Joint Full Waveform Inversion and Travel Time Tomography" $78^{th}$ EAGE Conference & Exhibition, *EAGE Publications BV*, 5 pages.

Zhang J, et al. (2014) "Joint Seismic Traveltime and Waveform Inversion for near Surface Imaging." *SEG Technical Program Expanded Abstracts*, vol. 33, pp. 934-936.

* cited by examiner

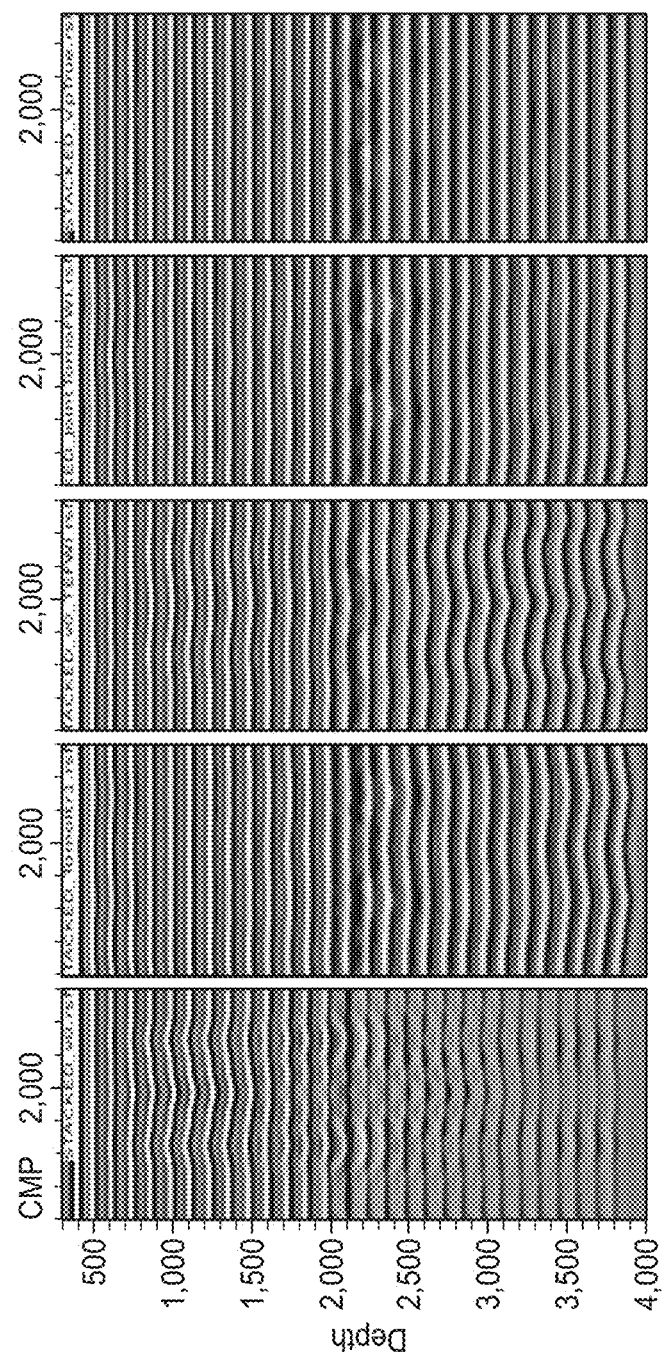

FULL WAVEFIELD INVERSION WITH AN IMAGE-GATHER-FLATNESS CONSTRAINT

CROSS-REFERENCE TO RELATED APPLICATION

This application claims the benefit of U.S. Provisional Patent Application 62/693,073 filed Jul. 2, 2018 entitled FULL WAVEFIELD INVERSION WITH AN IMAGE-GATHER-FLATNESS CONSTRAINT, the entirety of which is incorporated by reference herein.

TECHNOLOGICAL FIELD

This disclosure relates generally to the field of geophysical prospecting and, more particularly, to seismic data processing. Specifically, the disclosure relates to a methods for full wavefield inversion of seismic data for hydrocarbon prospecting and management.

BACKGROUND

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as an admission of prior art.

An important goal of seismic prospecting is to accurately image subsurface structures or formations. Seismic prospecting is facilitated by obtaining raw seismic data during performance of a seismic survey, during which seismic energy can be generated at ground or sea level by, for example, a controlled explosion (or other form of source, such as vibrators), and delivered to the earth. Seismic waves are reflected from underground structures and are received by a number of sensors/receivers, such as geophones. The seismic data received by the sensors is processed in an effort to create an accurate mapping of the subsurface environment. The processed data is then examined with a goal of identifying geological formations that may contain hydrocarbons (e.g., oil and/or natural gas).

Tomographic migration velocity analysis (tomographic MVA) and full wavefield inversion (FWI) are two approaches to seismic data analysis and imaging. Tomographic MVA (i.e. ray-based reflection tomography) estimates a velocity model by minimizing residual depth errors (or equivalently travel time errors) in migrated image gathers. A gather refers to a display of seismic traces that share an acquisition parameter, such as a common midpoint or common shot. Tomographic MVA is a robust and relatively efficient process, and has been the standard approach for generating velocity models for subsurface imaging for the past two decades. Velocity models produced by this method, however, may be of relatively low resolution, because of the infinite frequency assumption of ray theory, which easily fails when the medium has strong velocity contrast and multi-pathing. In addition, minimization of residual depth errors in tomographic migration requires picking of residual moveout (RMO) on image gathers, which may be challenging, especially in areas of low S/N ratio, and sometimes even impossible in areas where image gathers are of poor quality and lacking coherency and continuity.

FWI, on the other hand, is a partial-differential-equation-constrained optimization method which iteratively minimizes a norm of the misfit between recorded seismic data and synthetic (or modeled) data obtained via numerical simulation. Specifically, FWI estimates a velocity model, or earth model in general, by minimizing the phase and amplitude mismatch between simulated and observed data by using wavefields as carriers of information. Seismic FWI involves multiple iterations, and a single iteration can involve the following computations: (1) solution of the forward equations, (2) solution of the adjoint equations, and (3) convolutions of these forward and adjoint solutions to yield a gradient of the cost function. For second-order optimization methods, such as Gauss-Newton, the (4) solution of the perturbed forward equations is also required. Wave-based approaches such as FWI can properly model complex wave phenomena and are immune from multi-pathing. The richer information of wavefields makes FWI capable of producing velocity models of very high resolution. However, fitting both phase and amplitude of the data is extremely challenging in practice due to inadequate physics used for wave simulation and the non-uniqueness of the solution. In addition, FWI may be prone to cycle skipping if the initial model is too far (half wavelength criterion) from the true solution. All these factors make FWI prone to getting stuck in local minima.

Different data types are typically used for tomographic MVA and FWI. For example, full bandwidth, fully processed data is usually used for tomographic migration (e.g., Kirchhoff) and hence for quality control of gather flatness, while low frequency (generally <15 Hz), minimally processed data (or even raw data) is typically used for FWI. However, the fact that the earth is of different heterogeneities at different scales would be expected to result in different kinematic information contained in data with different bandwidth. Indeed, in practice, it is often observed that image gathers become less flat after FWI even though it is possible to fit the data at relatively low frequencies. One pragmatic approach to accommodate these differences in data information may be to iterate between FWI and tomographic MVA in a sequential fashion. This strategy, however, would be expected to unduly complicate the seismic analysis process with no guarantee that it would actually improve the gather flatness, given that each process is run independently. Accordingly, a need exists for a seismic analysis approach that produces high-resolution velocity updates like FWI while enforcing gather flatness like ray-based tomography.

SUMMARY

The present disclosure provides methods for updating a physical properties model of a subsurface region that combine advantages of FWI, which produces high-resolution velocity updates but does not guarantee gather flatness, and tomographic MVA, which directly enforces gather flatness but has low resolution, into a joint inversion scheme. Specifically, a method according to aspects described herein comprises obtaining measured seismic data; generating, using a computer, simulated seismic data using an initial model; computing, with the computer, at least one of an FWI gradient and a tomography gradient; minimizing, with the computer, a joint objective function E, wherein the objective function E is based on a combination of the FWI gradient and the tomography gradient or preconditioning of the FWI gradient or the tomography gradient; generating, with the computer, a final model based on the minimized joint objective function E; and using the final model to generate an image of the subsurface. The joint objective function E may be a function of at least one of a FWI objective function $C_{FWI}$ and a tomography objective function $C_{Tomo}$. In some embodiments, the joint objective function E is defined by $E=(1-\lambda)C_{FWI}+\lambda C_{Tomo}$, where $\lambda$ is a weighting hyper-parameter.

According to certain aspects of the present disclosure, minimizing the joint objective function E may comprise defining a gradient of the joint objective function E as a function of a gradient of the FWI objective function $C_{FWI}$, a tomography operator, and a residual depth error. Alternatively, minimizing the joint objective function E may comprise defining a gradient of the joint objective function E as a function of the product of a gradient of the FWI objective function $C_{FWI}$ and an approximate inverse of a tomographic Hessian matrix. Or, minimizing the joint objective function E may comprise defining a gradient of the joint objective function E as a function of the product of a gradient of the tomography objective function $C_{Tomo}$ and an inverse of a FWI Hessian matrix. The inverse of the FWI Hessian matrix may be approximated, for example, using point-spread functions.

Additionally or alternatively, minimizing the joint objective function E may comprise finding a search direction using the FWI gradient or the tomography gradient; iteratively using the search direction to perform a line search to find an optimal step size to update a current model; and iteratively updating the current model based on the optimal step size and the search direction; wherein in the first iteration the current model is the initial model. Once a final model is obtained, it may be used to generate an image of the subsurface, which in turn may be used to manage hydrocarbons.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

FIG. 3A shows the migrated stack for an exemplary initial velocity model; FIG. 3B corresponds to the stack for the velocity model obtained with tomography only; FIG. 3C corresponds to the stack for the velocity model obtained with FWI only; FIG. 3D corresponds to the stack for the velocity model obtained after combining the FWI and tomography gradients according to aspects of the disclosure herein; and FIG. 3E corresponds to the stack for the true velocity model.

Figure 1:
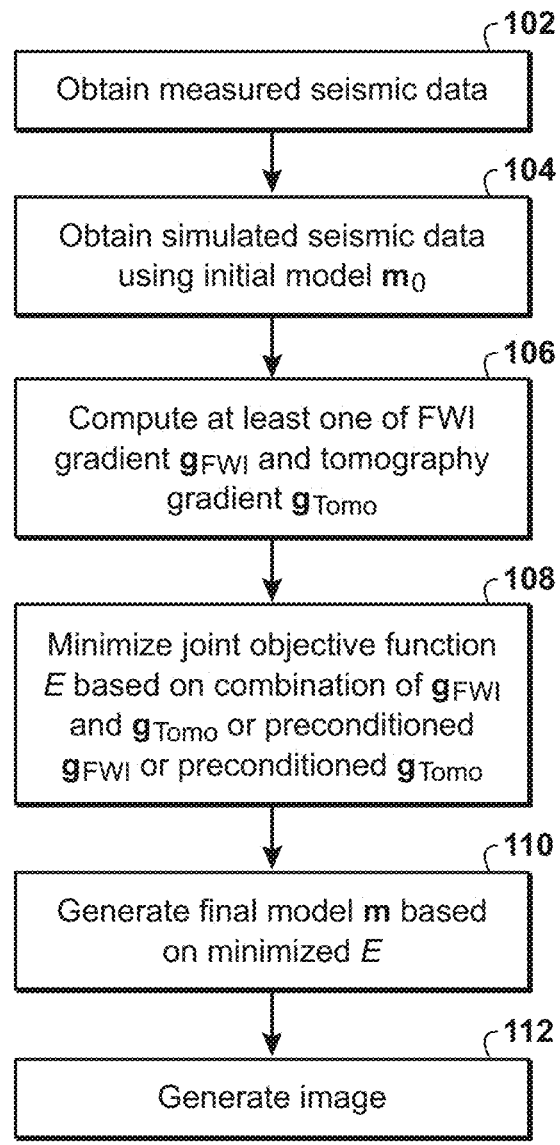
FIG. 1 is a flow chart of exemplary methods according to the present disclosure.

It should be noted that the figures are merely examples and no limitations on the scope of the present disclosure are intended thereby. Further, the figures are generally not drawn to scale, but are drafted for purposes of convenience and clarity in illustrating various aspects of the disclosure. Certain features and components therein may be shown exaggerated in scale or in schematic form and some details of conventional elements may not be shown in the interest of clarity and conciseness. When describing a figure, the same reference numerals may be referenced in multiple figures for the sake of simplicity.

DETAILED DESCRIPTION

To promote an understanding of the principles of the disclosure, reference will now be made to the features illustrated in the drawings and no limitation of the scope of the disclosure is hereby intended by specific language. Any alterations and further modifications, and any further applications of the principles of the disclosure as described herein are contemplated as would normally occur to one skilled in the art to which the disclosure relates.

A typical FWI algorithm may generally be described as follows: using a starting subsurface physical property model, synthetic seismic data are generated, i.e., modeled or simulated, by solving a wave equation (i.e., acoustic or elastic wave equation) using a numerical scheme (e.g., finite-difference, finite-element, etc.). The terms velocity model, earth model, and physical property model as used herein refer to an array of numbers, typically a 3-D array, where each number, which may be called a model parameter, is a value of velocity or another physical property in a cell, where a subsurface region has been conceptually divided into discrete cells for computational purposes. The synthetic seismic data are compared with the field seismic data and, using the difference between the two, an error or objective function is calculated. The objective function is a measure of the misfit between the simulated and observed data. Using the objective function, a modified subsurface model is generated which is used to simulate a new set of synthetic seismic data. This new set of synthetic seismic data is compared with the measured data to generate a new objective function. This process is repeated until the objective function is satisfactorily minimized and the final subsurface model is generated. A global or local optimization method is used to minimize the objective function and to update the subsurface model.

For example, a local cost function optimization procedure for FWI may be summarized as including the following steps: (1) select a starting model; (2) compute a search direction; and (3) search for an updated model that is a perturbation of the model in the search direction. The cost function optimization procedure is iterated by using the new updated model as the starting model for finding another search direction, which will then be used to perturb the model in order to better explain the observed data. The process continues until an updated model is found that satisfactorily explains the observed data. Commonly used local cost function optimization methods include gradient search, conjugate gradients, quasi Newton, Gauss-Newton and Newton's method. Commonly used global methods include Monte Carlo or grid search.

Aspects of the technological advancement described herein provide optimization methods that combine advantages of FWI and tomographic MVA. Specifically, constrained optimization methods are disclosed which estimate a common physical property model that simultaneously minimizes residual depth errors under ray theory and data mismatch under wave theory.

In general, a joint objective function E may be defined as follows:

$$E=(1-\lambda)C_{FWI}+\lambda C_{Tomo} \qquad \text{(Eq. 1)}$$

where $C_{FWI}$ and $C_{Tomo}$ represent the FWI and reflection tomography objective functions, respectively, and λ represents a hyper-parameter that controls the relative weight between the FWI and ray-based tomography objective functions. Optionally, regularization terms may be introduced in Eq. 1, such as Laplacian regularization (if smoothness is desired) or total variation regularization (if a blocky model is intended). For simplicity, these additional regularization terms will be omitted from the ensuing description, but it should be understood to persons of ordinary skill in the art that the present disclosure encompasses methods incorporating such regularization approaches as are known in the art.

Both FWI and tomography are intrinsically nonlinear problems, and both can be linearized. Accordingly, a variety of choices are available to jointly invert the two components, depending on whether both FWI and tomography are linearized or nonlinear, and how the problem is solved. While the present disclosure is intended to encompass all these variations, the following describes more in detail inversion methods where FWI is nonlinear and tomography is linearized, and where FWI is linearized and tomography is also linearized.

Joint Nonlinear FWI with Reflection Tomography

According to some aspects of the present disclosure, nonlinear FWI and linearized reflection tomography may be jointly inverted according to Eq. 1. The FWI objective function $C_{FWI}$ may be the data-domain objective function that measures the mismatch between simulated and observed data. The FWI objective function $C_{FWI}$ may be expressed by any misfit function known in the art, including without limitation, least squares (L2), trace-normalized cross-correlation, local cross-correlation, etc.

The reflection tomography objective function $C_{Tomo}$ may be defined in the residual-depth domain as follows:

$$C_{Tomo} = \|T(m-m_0) - \delta z\|^2 \quad \text{(Eq. 2)}$$

where $m_0$ is initial physical property model; m is the model for which the inversion is performed; T represents the tomography operator; and δz represents the depth error obtained from the migrated image gathers using the initial model $m_0$.

In some embodiments, a gradient-based approach may be used to directly minimize the joint objective function E expressed in Eq. 1. Specifically, the "joint" gradient of the misfit function with respect to model m may be expressed as:

$$\frac{\partial E}{\partial m} = (1-\lambda)g_{FWI} + \lambda g_{Tomo} = (1-\lambda)\frac{\partial C_{FWI}}{\partial m} + \lambda T^T r_{Tomo} \quad \text{(Eq. 3)}$$

where $g_{FWI}$ represents the FWI gradient; $g_{Tomo}$ is the tomography gradient; and $r_{Tomo}$ represents the residual depth error measured from the migrated image gathers using the current model m, and is expressed by:

$$r_{Tomo} = T(m-m_0) - \delta z \quad \text{(Eq. 4)}$$

Computing the tomography gradient $g_{Tomo}$ may comprise measuring residual moveout in image gathers generated from the seismic data and building tomographic equations to obtain the tomography gradient $g_{Tomo}$.

The joint gradient $$\frac{\partial E}{\partial m}$$

is indicative of the rate of change of the FWI/tomography combined misfit function in a given direction. The physical property model m may then be updated using the gradient direction together with an appropriate line search technique that finds a suitable step length. A line search involves model-simulating seismic data for various different "step" sizes along the search direction in the multi-dimensional parameter space. The step size that minimizes the misfit between the model-simulated data and the measured data is selected.

As can be appreciated from Eq. 1, the relative weight of FWI and reflection tomography is controlled by the hyper-parameter λ, which may range between 0 and 1. In some cases, this parameter may be determined based on how strong a user would like the final solution to lean towards the tomography solution. For example, in the linearized case, λ may be valued ≤0.5 to favor approximating a FWI solution and ≥0.5 to favor approximating a tomography solution if both objective functions have been normalized such that they have a similar range of values. Adopting a value of λ=1, the solution may be expected to be the same as the tomography solution. In other cases, it may be desirable to introduce spatially varying weights when combining the FWI and tomography gradients such that the solution favors tomography at locations where tomography is known to produce accurate results, and favors FWI at other locations where tomography is inadequate. This can be achieved by introducing a weighting operator in Eq. 2 as follows:

$$C_{Tomo} = \|W(T(m-m_0) - \delta z)\|^2 \quad \text{(Eq. 5)}$$

where W is a weighting factor and is spatially varying, and may be assumed to have large values where a user wishes the solution to favor the tomography solution, and small values where a user desires the solution to favor FWI solutions. For practical applications, the choices of λ and W may be based on user-experience.

In some instances, an optimal hyper-parameter λ may be difficult to determine and require a trial-and-error process that may be time consuming. Accordingly, certain embodiments described below may eliminate the need to explicitly determine a hyper-parameter λ.

Reflection-Tomography-Constrained Nonlinear FWI

According to other aspects of the present disclosure, a nonlinear FWI objective function and a linearized reflection tomography objective function may be jointly inverted according to Eq. 1, but instead of defining the reflection tomography objective function $C_{Tomo}$ in the residual-depth domain, it may be defined in the model domain as follows:

$$C_{Tomo} = \|H_{Tomo}(m-m_0) - T^T \delta z\|^2 \quad \text{(Eq. 6)}$$

where $H_{Tomo}$ represents the Hessian matrix for ray-based reflection tomography and may be expressed as:

$$H_{Tomo} = T^T T \quad \text{(Eq. 7)}$$

Additionally, the updated model m may be defined to satisfy the following form:

$$m = Kp + K(H_{Tomo}m_0 + T^T \delta z) \approx Kp + KT^T \delta z + m_0 \quad \text{(Eq. 8)}$$

where K is a mapping operator defined to be the approximate inverse of the tomographic Hessian, i.e. $K \approx H_{Tomo}^{-1}$, and p represents a model in the transform domain that the inversion will actually operate on and is obtained by transforming the original model m according to Eq. 8. Replacing m in Eq. 6 with Eq. 8, and then replacing $C_{Tomo}$ in Eq. 1 using Eq. 6 yields:

$$E(p) = (1-\lambda)C_{FWI}(Kp + KT^T \delta z + m_0) + \lambda \|p\|^2 \quad \text{(Eq. 9)}$$

It should be noted that the term $\lambda\|p\|^2$ in Eq. 9 is a simple damping term which may, optionally, may be dropped. Accordingly, the objective function E to minimize may be expressed as:

$$E(p)=C_{FWI}(Kp+K T^T \delta z+m_0) \quad \text{(Eq. 10)}$$

Using Eq. 10, the gradient of the joint objective function E with respect to p may be expressed as:

$$\left.\frac{\partial E}{\partial p}\right|_{p=x} = K^T \left.\frac{\partial C_{FWI}}{\partial m}\right|_{m=Kx+KT^T \delta z+m_0} \quad \text{(Eq. 11)}$$

where p=x. The above may be understood as "preconditioning" the FWI gradient $g_{FWI}$ using the tomography Hessian because of the additional operator $K^T$, i.e., the transpose of the inverse of the tomography Hessian, in front of the original FWI gradient $$\frac{\partial C_{FWI}}{\partial m}.$$

The joint gradient $$\frac{\partial E}{\partial p}$$

may then be minimized according to techniques described above to arrive at a final model p in the transform domain, from which the model m can be obtained and used to generate a subsurface image that can be used to prospect for or manage hydrocarbons.

Linearized-FWI-Constrained Reflection Tomography

According to other aspects of the present disclosure, a joint objective function E may be obtained by inverting a linearized FWI objective function $C_{FWI}$ and a linearized reflection tomography objective function $C_{Tomo}$ according to Eq. 1. The linearization of the FWI objective function $C_{FWI}$ may be achieved, for example, using the Newton/Gauss-Newton equation of the nonlinear FWI as follows:

$$H_{FWI}\Delta m = -g_{FWI} \quad \text{(Eq. 12)}$$

where $g_{FWI}$ and $H_{FWI}$ are the gradient and the Hessian of the FWI data-domain objective function, respectively (such as L2 or cross-correlation), evaluated at initial model $m_0$. $\Delta m$ corresponds to the velocity perturbation to be recovered.

Solving Eq. 12 is equivalent to minimizing a model-domain objective function as follows:

$$C_{FWI}(\Delta m)=\|H_{FWI}\Delta m + g_{FWI}\|^2 \quad \text{(Eq. 13)}$$

For the tomography objective function $C_{Tomo}$, linearization may be achieved as follows:

$$C_{Tomo}(\Delta m)=\|T(m_0)\Delta m - \delta z(m_0)\|^2 \quad \text{(Eq. 14)}$$

It should be appreciated that, in contrast to the two approaches described above involving nonlinear FWI objective functions and direct inversion of a model such as the velocity model itself, the approach described here involves inverting the velocity perturbation when dealing with both linearized components.

To perform another change of variable, the velocity perturbation term $\Delta m$ may be defined as:

$$\Delta m = Jq - Jg_{FWI} \quad \text{(Eq. 15)}$$

where q is a model in the new inversion parameter space after transforming the original velocity perturbation $\Delta m$ according to Eq. 14, and J represents the approximate inversion of the FWI Hessian, i.e. $J \approx H_{FWI}^{-1}$.

Substituting Eq. 13 and Eq. 14 into Eq. 1, and applying a change of variables according to Eq. 15, yields:

$$E=(1-\lambda)\|q\|+\lambda\|TJq - TJg_{FWI} - \delta z\|^2 \quad \text{(Eq. 16)}$$

In Eq. 16, the FWI objective function $C_{FWI}$ becomes a simple damping term which may, optionally, be ignored to obtain the following objective function to minimize:

$$E=\|TJq - TJg_{FWI} - \delta z\|^2 \quad \text{(Eq. 17)}$$

Then the gradient of Eq. 15 with respect to q may be obtained as:

$$\left.\frac{\partial E}{\partial q}\right|_{q=x} = J^T T^T r \quad \text{(Eq. 18)}$$

where r is the tomography residual and can be expressed by:

$$r=TJ(x-g_{FWI})-\delta z \quad \text{(Eq. 19)}$$

Eq. 18 may be understood as "preconditioning" the tomography gradient $g_{FWI}$ because of the additional operator $J^T$ applied to $T^T r$. The model q may be optimized using any approach (e.g., a gradient-based approach). Once the model q is obtained, Eq. 13 may be used to obtain the desired velocity perturbation $\Delta m$. An image of the subsurface may be generated based on a final model m which can then be used to prospect for or manage hydrocarbons.

Optionally, to reduce computational costs involved in computing the FWI Hessian matrix $H_{FWI}$ and avoid storage difficulties associated with storing the full $H_{FWI}$ in computer memory, particularly when dealing with industry-scale applications, the FWI Hessian matrix $H_{FWI}$ may be approximated, and hence its inverse as well. For example, point spread functions (PSFs) may be used for this purpose, such as by storing only sampled columns as described in Tang and Lee (2015), incorporated herein by reference in its entirety. The inverse of the PSF-approximated Hessian matrix (i.e., $J \approx H_{FWI}^{-1}$) may also be approximated using non-stationary match filters as described, for example, in Guitton (2004). Additionally or alternatively, the inverse of the PSF-approximated Hessian matrix may be computed only once to be stored in computer disk or memory, to be reused for minimizing the objective function defined in Eq. 17.

Exemplary Flowchart

Referring to FIG. 1, a flowchart of methods described herein is provided. At step 102, the method may begin by obtaining measured seismic data. The data may be obtained by either conducting a survey and generating the data using source and receivers as is well known in the art, or by operation of a computer to select, access, download, or receive stored seismic data.

At step 104, simulated seismic data may be generated. For example, an initial model $m_0$ as described above may be used to generate the simulated seismic data. The initial model $m_0$ may be based on or obtained from any seismic processing techniques, such as stacking velocity analysis, prestack time/depth MVA, FWI, well log and rock physics analysis, or a combination of these techniques.

Next, at step 106, a gradient of an objective function with respect to a model parameter may be computed using full wavefield inversion to obtain an FWI gradient ($g_{FWI}$), and/or a gradient of an objective function with respect to the same model parameter may be computed using reflection tomography to obtain a tomography gradient ($g_{Tomo}$). It should be understood that, at this step, only one gradient may be computed, or both gradients may be computed simultaneously, or the FWI gradient may be computed before the tomography gradient, or vice versa. The gradient of an objective function may be computed using the model at the current iteration, the observed data and depth error measured from common image gathers obtained by migrating the observed data. For example, computing the tomography gradient $g_{Tomo}$ may comprise measuring residual moveout in image gathers generated from the seismic data and building tomographic equations to obtain the tomography gradient. Computing the FWI gradient $g_{FWI}$ may comprise propagating the source and data residual wavefields through the model by solving the wave equation with numerical methods, such as finite difference, finite element, etc., and cross-correlating the two wavefields at every image location to form the gradient volumes.

At step 108, the joint objective function E may be minimized. For example, the FWI gradient $g_{FWI}$ and the tomography gradient $g_{Tomo}$ may be combined to obtain a joint gradient $$\frac{\partial E}{\partial m}$$

under an assumption that the respective FWI and tomography objective functions may be weighted and added according to the principle of Eq. 1. The FWI gradient and tomography gradients (or corresponding objective functions) may be weighted equally or differently according to a hyperparameter λ as described above. Minimizing the joint objective function E would thus involve defining a gradient $$\frac{\partial E}{\partial m}$$

as in Eq. 3 to optimize.

In an approach based on reflection-tomography-constrained nonlinear FWI, the joint objective function E may be based on a preconditioned FWI gradient $g_{FWI}$. Specifically, the joint gradient $$\frac{\partial E}{\partial p}$$

may be defined according to Eq. 11 and minimized to obtain a final model p from which the physical property model m can be obtained. In a linearized-FWI-constrained reflection tomography approach, the joint objective function E may be based on a preconditioned tomography gradient $g_{FWI}$. In particular, the joint gradient $$\frac{\partial E}{\partial q}$$

may be defined according to Eq. 18 and minimized to obtain a final model q from which the physical property model m can be obtained.

Additionally, minimizing the joint objective function E may comprise finding a search direction using the FWI gradient $g_{FWI}$ or the tomography gradient $g_{Tomo}$. Once the search direction is determined, any line search algorithm may be used to find an optimal step size for model updating in an iterative process (i.e. iteratively using the search direction to perform a line search to find an optimal step size to update a current model, and iteratively updating the current model based on the optimal step size and the search direction). Once the joint gradient is optimized, a final model m may be obtained at step 110. It should be understood that, while an example is described based on a gradient search approach, any misfit function inversion method may be used in connection with methods described herein to obtain an updated model based on the joint gradient, including without limitation conjugate gradients and Newton's method.

At step 112, the updated model m may be used to generate an image of the subsurface for the purpose of hydrocarbon management or prospecting. As used herein, hydrocarbon management includes hydrocarbon extraction, hydrocarbon production, hydrocarbon exploration, identifying potential hydrocarbon-bearing formations, characterizing hydrocarbon-bearing formations, identifying well locations, determining well injection rates, determining well extraction rates, identifying reservoir connectivity, acquiring, disposing of and/or abandoning hydrocarbon resources, reviewing prior hydrocarbon management decisions, and any other hydrocarbon-related acts or activities. For, example, prospecting can include causing a well to be drilled that targets a hydrocarbon deposit derived from a subsurface image generated from the updated model.

Numerical Example

To illustrate benefits of methods disclosed herein, an example using synthetic data is provided. The 2-D synthetic data was generated using a marine acquisition geometry with maximum offset being 6 km. The data was simulated using acoustic physics and a PML boundary condition.

Figures 2A, 2B, 2C, 2D:
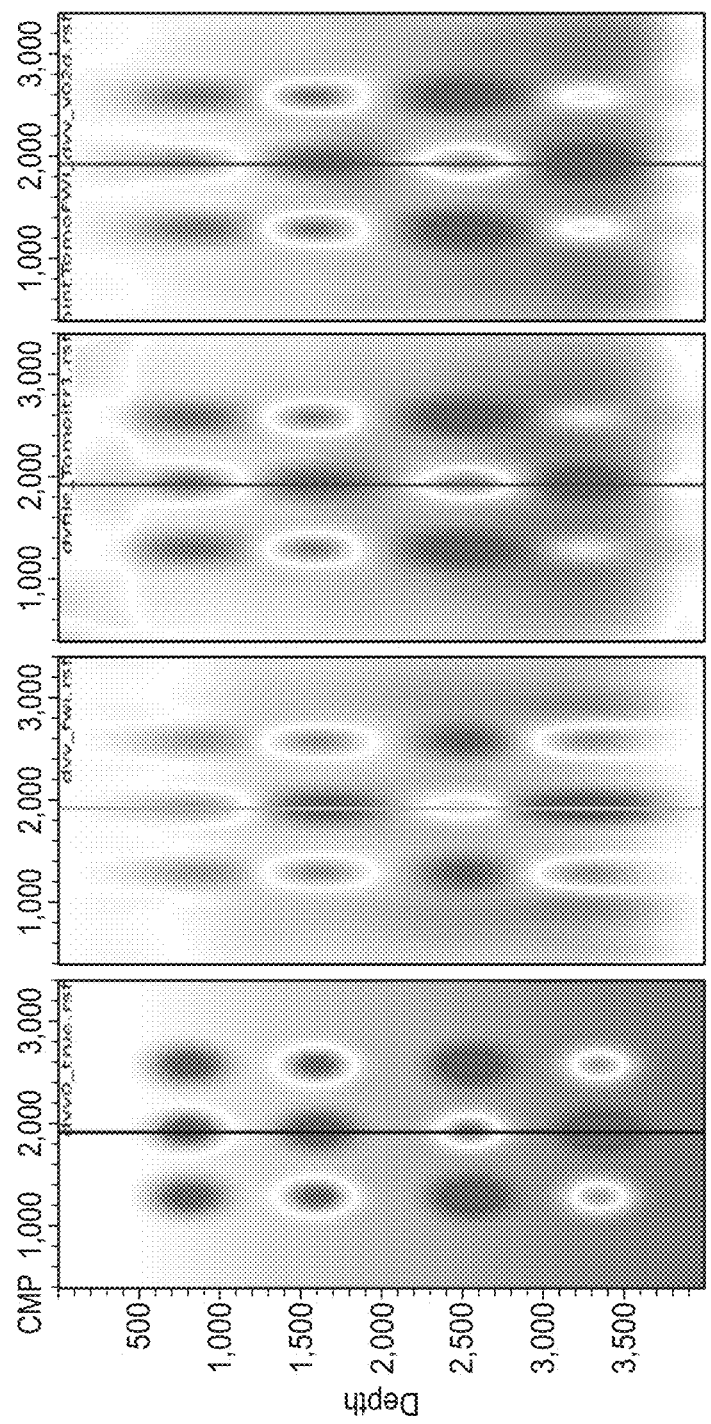
FIG. 2A shows an exemplary velocity perturbation.
FIG. 2B shows an exemplary inverted velocity perturbation obtained using FWI.
FIG. 2C shows an exemplary velocity perturbation obtained using reflection tomography.
FIG. 2D shows an exemplary inverted velocity perturbation obtained by applying inversion methods described herein.

To illustrate some advantages of the disclosed technological advancement, a "true" velocity perturbation (the difference between the true velocity model and the initial model) is illustrated in FIG. 2A. FIG. 2B shows the inverted velocity perturbation obtained using FWI only, and FIG. 2C shows the inverted velocity perturbation obtained using reflection tomography. FIG. 2D in turn is the inverted velocity perturbation obtained applying an inversion method as described herein where the gradient $g_{FWI}$ and the tomography gradient $g_{Tomo}$ were combined to obtain a joint gradient $$\frac{\partial E}{\partial m}$$

according to Eq. 3. A comparison of FIG. 2B, FIG. 2C, and FIG. 2D shows that the latter is much closer to the true velocity model.

With reference to FIGS. 3A-3E, the migrated stacks corresponding to the velocity perturbations shown in FIGS. 2A-2D are provided. FIG. 3A corresponds to the stack for the initial velocity model, FIG. 3B corresponds to the stack for the velocity model obtained with tomography only, FIG. 3C corresponds to the stack for the velocity model obtained with FWI only, FIG. 3D corresponds to the stack for the velocity model obtained after combining the FWI and tomography gradients according to aspects of the disclosure herein, and FIG. 3E corresponds to the stack for the true velocity model. A comparison of these figures shows that the migrated stack corresponding to the velocity model obtained using a joint gradient (combining FWI and tomography) according to methods disclosed herein is the closest to the true velocity stack with less distortion to the flat reflectors, particularly down deep, and increased accuracy of reflector depths. It should be noted that, while FIG. 3D is the result of an approach where the objective function E is based on the combination of the FWI and tomography gradients, similar benefits are expected of approaches involving preconditioning of one or the other gradient.

Figure 4:
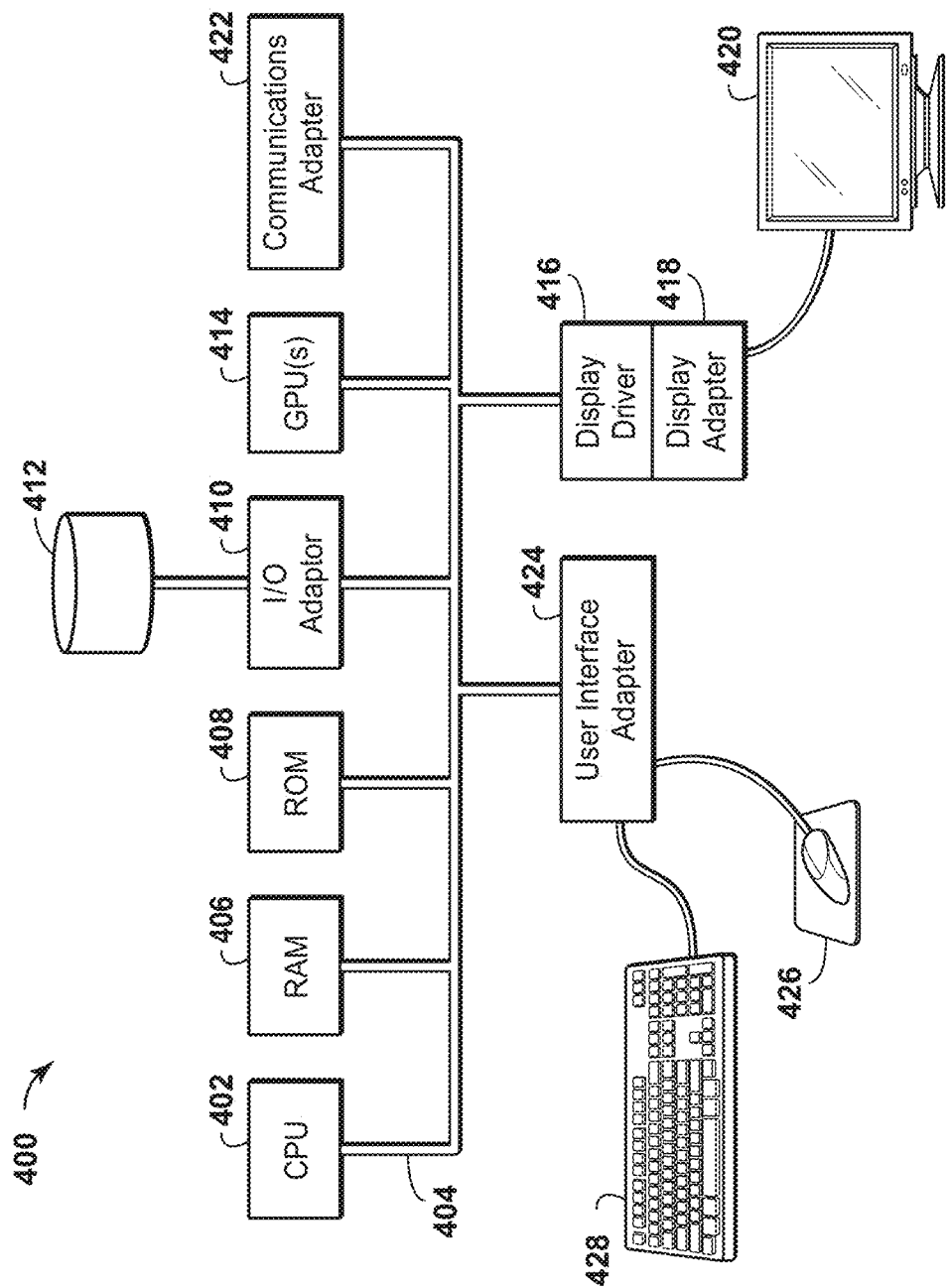
FIG. 4 is a diagram of an exemplary computer system that may be utilized to implement aspects of the present disclosure.

In all practical applications, the present technological advancement must be used in conjunction with a computer, programmed in accordance with the disclosures herein. For example, FIG. 4 is a diagram of an exemplary computer system 400 that may be utilized to implement methods described herein. A central processing unit (CPU) 402 is coupled to system bus 404. The CPU 402 may be any general-purpose CPU, although other types of architectures of CPU 402 (or other components of exemplary system 400) may be used as long as CPU 402 (and other components of system 400) supports the operations as described herein. Those of ordinary skill in the art will appreciate that, while only a single CPU 402 is shown in FIG. 4, additional CPUs may be present. Moreover, the computer system 400 may comprise a networked, multi-processor computer system that may include a hybrid parallel CPU/GPU system. The CPU 402 may execute the various logical instructions according to various teachings disclosed herein. For example, the CPU 402 may execute machine-level instructions for performing processing according to the operational flow described.

The computer system 400 may also include computer components such as non-transitory, computer-readable media. Examples of computer-readable media include a random access memory (RAM) 406, which may be SRAM, DRAM, SDRAM, or the like. The computer system 400 may also include additional non-transitory, computer-readable media such as a read-only memory (ROM) 408, which may be PROM, EPROM, EEPROM, or the like. RAM 406 and ROM 408 hold user and system data and programs, as is known in the art. The computer system 400 may also include an input/output (I/O) adapter 410, a graphics processing unit (GPU) 414, a communications adapter 422, a user interface adapter 424, a display driver 416, and a display adapter 418.

The I/O adapter 410 may connect additional non-transitory, computer-readable media such as a storage device(s) 412, including, for example, a hard drive, a compact disc (CD) drive, a floppy disk drive, a tape drive, and the like to computer system 400. The storage device(s) may be used when RAM 406 is insufficient for the memory requirements associated with storing data for operations of the present techniques. The data storage of the computer system 400 may be used for storing information and/or other data used or generated as disclosed herein. For example, storage device(s) 412 may be used to store configuration information or additional plug-ins in accordance with the present techniques. Further, user interface adapter 424 couples user input devices, such as a keyboard 428, a pointing device 426 and/or output devices to the computer system 400. The display adapter 418 is driven by the CPU 402 to control the display on a display device 420 to, for example, present information to the user such as subsurface images generated according to methods described herein.

The architecture of system 400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 400 may include various plug-ins and library files. Input data may additionally include configuration information.

Preferably, the computer is a high performance computer (HPC), known as to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

Disclosed aspects may include any combinations of the methods and systems shown in the following numbered paragraphs. This is not to be considered a complete listing of all possible aspects, as any number of variations can be envisioned from the description above.

The foregoing application is directed to exemplary embodiments of the present technological advancement for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, some or all of the steps in the present inventive method are performed using a computer, i.e. the invention is computer implemented. In such cases, the resulting gradient or updated physical properties model may be downloaded or saved to computer storage.

REFERENCES

The following references are incorporated herein by reference in their entirety:

Allemand T, et al. "Full Waveform Inversion Guided Migration Velocity Analysis." *SEG Technical Program Expanded Abstracts*, vol. 33, 2014, pp. 4712-4717, doi: 10.1190/segam2014-0506.1.

Biondi, Biondo, and Ali Almomin. "Tomographic Full-Waveform Inversion (TFWI) by Combining FWI and Wave-Equation Migration Velocity Analysis." *The Leading Edge*, vol. 32, no. 9, 2013, pp. 1074-1080, doi: 10.1190/tle32091074.1.

Fleury, C, et al. "Bi-Objective Optimization for the Inversion of Seismic Reflection Data: Combined FWI and MVA." *Bi-Objective Optimization for the Inversion of Seismic Reflection Data: Combined FWI and MVA*, Red Hook, N.Y.; Curran Associates, Inc.; 2013, 2013, pp. 2908-2913.

Guitton, Antoine. "Seismic Migration—Amplitude and Kinematic Corrections of Migrated Images for Nonunitary Imaging Operators." *Geophysics*, vol. 69, no. 4, 2004, p. 1017.

Tang Y, et al. "Multi-Parameter Full Wavefield Inversion Using Non-Stationary Point-Spread Functions." *SEG Technical Program Expanded Abstracts*, vol. 34, 2015, pp. 1111-1115, doi:10.1190/segam2015-5918876.1.

Tarantola A. "Inversion of Seismic Reflection Data in the Acoustic Approximation." *Geophysics*, vol. 49, no. 8, 1984, pp. 1259-1266.

Treister, E, et al. "Proceedings." *Joint Full Waveform Inversion and Travel Time Tomography*, EAGE Publications BV, 2016.

Zhang J, et al. "Joint Seismic Traveltime and Waveform Inversion for near Surface Imaging." *SEG Technical Program Expanded Abstracts*, vol. 33, 2014, pp. 934-937, doi:10.1190/segam2014-1501.1.

What is claimed is:

1. A method for updating a physical properties model of a subsurface region in an iterative full wavefield inversion (FWI) of seismic data, said method comprising:

obtaining measured seismic data;

generating, using a computer, simulated seismic data using an initial model;

computing, with the computer, an FWI gradient and a tomography gradient;

minimizing, with the computer, a joint objective function E, wherein the joint objective function E is based on a combination of the MT gradient and the tomography gradient or preconditioning of the FWI gradient or the tomography gradient, wherein the joint objective function E is a function of at least one of a FWI objective function $C_{FWI}$ and a tomography objective function $C_{Tomo}$ and wherein the joint objective function E is defined by:

$$E=(1-\lambda)C_{FWI}+\lambda C_{Tomo}$$

where $\lambda$ is a weighting hyper-parameter;

generating, with the computer, a final model based on the minimized joint objective function E; and using the final model to generate an image of the subsurface.

2. The method of claim 1, wherein minimizing the joint objective function E comprises defining a gradient of the joint objective function F as a function of a gradient of the FWI objective function $C_{FWI}$, a tomography operator, and a residual depth error.

3. The method of claim 1, wherein minimizing the joint objective function E comprises defining a gradient of the joint objective function E as a function of the product of a gradient of the FWI objective function $C_{FWI}$ and an approximate inverse of a tomographic Hessian matrix.

4. The method of claim 1, wherein minimizing the joint objective function E comprises defining a gradient of the joint objective function E as a function of the product of a gradient of the tomography objective function $C_{Tomo}$ and an inverse of a FWI Hessian matrix.

5. The method of claim 4, wherein the inverse of the FWI Hessian matrix is approximated using point-spread functions.

6. The method of claim 1, wherein minimizing the joint objective function F comprises:

finding a search direction using the FWI gradient or the tomography gradient;

iteratively using the search direction to perform a line search to find an optimal step size to update a current model; and iteratively updating the current model based on the optimal step size and the search direction;

wherein in the first iteration the current model is the initial model.

7. The method of claim 1, wherein computing the tomography gradient comprises measuring residual moveout in image gathers generated from the seismic data and building tomographic equations to obtain the tomography gradient.

8. The method of claim 1, further comprising using the image of the subsurface to manage hydrocarbons.

9. The method of claim 1, wherein the final model is a velocity model.

* * * * *